US012283754B2

(12) United States Patent
Liu et al.

(10) Patent No.: US 12,283,754 B2
(45) Date of Patent: Apr. 22, 2025

(54) ANTENNA DEVICE AND ELECTRONIC DEVICE

(71) Applicant: GUANGDONG OPPO MOBILE TELECOMMUNICATIONS CORP., LTD., Guangdong (CN)

(72) Inventors: Huanhong Liu, Guangdong (CN); Haijun Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 170 days.

(21) Appl. No.: 18/058,449

(22) Filed: Nov. 23, 2022

(65) Prior Publication Data

US 2023/0099917 A1 Mar. 30, 2023

Related U.S. Application Data

(63) Continuation of application No. PCT/CN2021/084046, filed on Mar. 30, 2021.

(30) Foreign Application Priority Data

May 25, 2020 (CN) ........................ 202010453115.1
May 25, 2020 (CN) ........................ 202020902357.X

(51) Int. Cl.
*H01Q 21/28* (2006.01)
*H01Q 21/29* (2006.01)

(52) U.S. Cl.
CPC ............ *H01Q 21/28* (2013.01); *H01Q 21/29* (2013.01)

(58) Field of Classification Search
CPC ...... H01Q 21/28; H01Q 121/29; H01Q 5/328; H01Q 5/335; H01Q 21/29; H01Q 21/20
See application file for complete search history.

(56) References Cited

U.S. PATENT DOCUMENTS

2014/0266938 A1* 9/2014 Ouyang ................. H01Q 5/321 343/729
2018/0090847 A1* 3/2018 Romano ............. H01Q 9/0414
(Continued)

FOREIGN PATENT DOCUMENTS

CN 106785350 5/2017
CN 108832267 11/2018
(Continued)

OTHER PUBLICATIONS

World 5G Frequency Bands (Year: 2018).*
(Continued)

*Primary Examiner* — Dimary S Lopez Cruz
*Assistant Examiner* — Anna N Hamadyk
(74) *Attorney, Agent, or Firm* — Hodgson Russ LLP

(57) ABSTRACT

An electronic device and an antenna device are provided. The electronic device includes a metal frame defined with multiple gaps, and the multiple gaps divide the metal frame into multiple independent frame segments used as antenna bodies supporting frequency bands of communication standards. At least three frame segments of the multiple frame segments support a 5G frequency band, at least one frame segment of the at least three frame segments further supports an MHB frequency band of LTE, and at least one frame segment except the at least three frame segments of the multiple frame segments supports the MHB frequency band of LTE. At least one frame segment supporting the MHB frequency band of LTE except the at least three frame segments supporting the 5G frequency band is used for achieving a 5G NSA communication standard together with the at least three frame segments supporting the 5G frequency band.

20 Claims, 8 Drawing Sheets

(56) References Cited

U.S. PATENT DOCUMENTS

| | | | | |
|---|---|---|---|---|
| 2019/0312333 | A1* | 10/2019 | Kim | H01Q 9/42 |
| 2019/0356040 | A1 | 11/2019 | Kim et al. | |
| 2020/0350660 | A1* | 11/2020 | Kim | H05K 7/1427 |
| 2020/0411957 | A1* | 12/2020 | Zhu | H01Q 5/307 |
| 2021/0135351 | A1* | 5/2021 | Son | H01Q 1/48 |

FOREIGN PATENT DOCUMENTS

| | | | | |
|---|---|---|---|---|
| CN | 208433511 | U | * | 1/2019 |
| CN | 208433519 | U | | 1/2019 |
| CN | 208539094 | | | 2/2019 |
| CN | 208539096 | U | * | 2/2019 |
| CN | 208674363 | | | 3/2019 |
| CN | 209072551 | | | 7/2019 |
| CN | 110571514 | | | 12/2019 |
| CN | 209929481 | | | 1/2020 |
| CN | 110994156 | | | 4/2020 |

OTHER PUBLICATIONS

EPO, Extended European Search Report issued for EP Application No. 21812420.4, Nov. 3, 2023.

WIPO, International Search Report for PCT Application No. PCT/CN2021/084046, Jun. 24, 2021.

CNIPA, Notice of Grant of Utility Model Patent Right for CN Application No. 202020902357.X, Oct. 21, 2020.

CNIPA, First Office Action for CN Application No. 202010453115.1, Aug. 16, 2024.

* cited by examiner

ANTENNA DEVICE AND ELECTRONIC DEVICE

CROSS REFERENCE OF RELATED APPLICATIONS

This application is a continuation of International Application No. PCT/CN2021/084046, filed Mar. 30, 2021, which claims priority to Chinese Patent Application No. 202010453115.1, filed May 25, 2020, and priority to Chinese Patent Application No. 202020902357.X, filed May 25, 2020, the entire disclosures of which are incorporated herein by reference.

TECHNICAL FIELD

The disclosure relates to the field of mobile communication technologies, and more particularly to an antenna device and an electronic device.

BACKGROUND

At present, with the popularization of full screens and curved screens, there is less and less clearance left for antennas, and due to the increase of frequency bands such as fifth-generation mobile communication technology (5G), the number of antennas is more than long term evolution of fourth-generation mobile communication technology (4G LTE), resulting in difficult antenna layout and reduced efficiency. At present, metal frame antennas are usually used to solve problems of more antenna requirements and less clearance. However, in the related art, the number of antennas that can be made by the frame is limited, and thus more other antennas need to be added except the metal frame antennas in a device, in which more antennas added in the device would affect the antenna performance and increase the cost.

SUMMARY

The present disclosure aims to provide an antenna device and an electronic device to solve the above problems.

In order to solve the above technical problems, an electronic device is provided. The electronic device includes a metal frame disposed with multiple gaps. The multiple gaps divide the metal frame into multiple frame segments being independent from one another. The multiple frame segments are configured as antenna bodies supporting frequency bands of communication standards. At least three frame segments of the multiple frame segments support at least one fifth-generation mobile communication technology (5G) frequency band, at least one frame segment of the at least three frame segments supporting the at least one 5G frequency band further supports an middle high band (MHB) frequency band of long term evolution (LTE), and at least one frame segment of the multiple frame segments except the at least three frame segments supporting the at least one 5G frequency band supports the MHB frequency band of LTE. The at least one frame segment, supporting the MHB frequency band of LTE, of the multiple frame segments except the at least three frame segments supporting the at least one 5G frequency band is configured to realize a 5G non-standalone (NSA) communication standard together with the at least three frame segments supporting the at least one 5G frequency band.

BRIEF DESCRIPTION OF DRAWINGS

In order to describe technical solutions of embodiments of the present disclosure more clearly, the following briefly introduces the accompanying drawings required for the embodiments. Apparently, the accompanying drawings in the following description are some embodiments of the present disclosure. For those skilled in the art, they can obtain other drawings based on these accompanying drawings without paying creative labor.

DETAILED DESCRIPTION OF EMBODIMENTS

Technical solutions in embodiments of the present disclosure will be described clearly and completely below in combination with the accompanying drawings in the embodiments of the present disclosure. Apparently, the described embodiments are merely some but not all of embodiments of the present disclosure. Based on the embodiments in the present disclosure, all other embodiments obtained by those skilled in the art without paying creative labor shall fall within the protection scope of the present disclosure.

In the description of the embodiments of the present disclosure, it should be understood that orientation or position relationships indicated by a term "direction" is based on the orientation or position relationships illustrated in the accompanying drawings, which is merely for the convenience of describing the present disclosure and simplifying the description, rather than implying or indicating that devices or elements must have a specific orientation, and are structured and operated in the specific orientation, and therefore cannot be understood as a limitation of the present disclosure.

Figure 1:
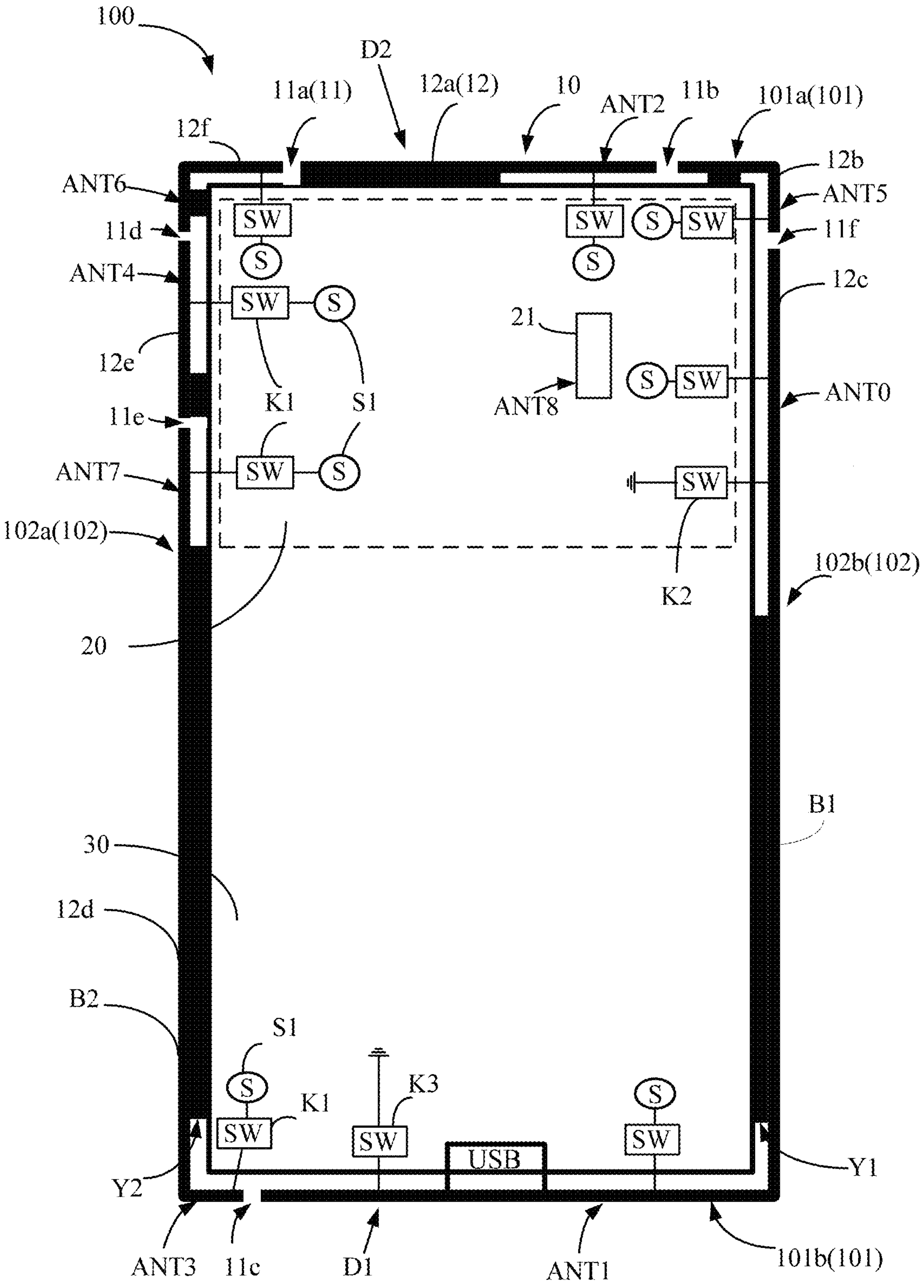
FIG. 1 illustrates a schematic plan view of a part of an internal structure of an electronic device according to an embodiment of the present disclosure.

FIG. 1 illustrates a schematic plan view of a part of an internal structure of an electronic device according to an embodiment of the present disclosure. As shown in FIG. 1, an electronic device 100 includes a metal frame 10 disposed with multiple gaps 11. The multiple gaps 11 divide the metal frame 10 into multiple frame segments 12 being independent from one another. The multiple frame segments 12 are used as antenna bodies supporting frequency bands of communication standards. At least three frame segments of the multiple frame segments support a fifth-generation mobile communication technology (5G) frequency band, at least one frame segment of the at least three frame segments supporting the 5G frequency band further supports a middle high band (MHB) frequency band of long term evolution (LTE), and at least one frame segment of the multiple frame segments except the at least three frame segments supporting the 5G frequency band supports the MHB frequency band of LTE. The at least one frame segment, supporting the MHB frequency band of LTE, of the multiple frame segments except the at least three frame segments supporting the 5G frequency band is used to realize a 5G non-standalone (NSA) communication standard together with the at least three frame segments supporting the 5G frequency band.

Therefore, in the present disclosure, the at least one frame segment of the at least three frame segments supporting the 5G frequency band simultaneously supports the MHB frequency band of LTE, so that the number of antenna bodies can be reduced; and the 5G NSA communication standard is realized by the at least one frame segment, supporting the MHB frequency band of LTE, of except the at least three frame segments supporting 5G frequency band together with the at least three frame segments supporting 5G frequency band. The 5G NSA communication standard is mainly realized by the metal frame, so than the antenna performance is improved, and the cost is reduced.

Specifically, the frequency bands of the communication standards supported by the multiple frame segments 12 include frequency bands of 5G NSA, 5G standalone (SA), wireless fidelity (WIFI), global positioning system (GPS), and 2/3/4G (the $2^{nd}/3^{rd}/4^{th}$ generation mobile communication technology).

Specifically, the at least three frame segments support the 5G frequency band, which means that the at least three frame segments support frequency bands under 5G NSA and/or 5G SA. The MHB of LTE refers to a middle high band under a 4G LTE communication standard.

In some embodiments, at least one gap is defined in the metal frame 10 at a bottom D1 of the electronic device 100.

Therefore, in the present disclosure, the multiple frame segments of the metal frame 10 are used as the antenna bodies to support the frequency bands under the multiple communication standards including 5G NSA, 5G SA, WIFI, GPS and 2/3/4G, so as to meet communication requirements, and the at least one gap is defined at a position of the metal frame 10 located the bottom of the electronic device 100 can reduce or avoid opening a gap at a position of the metal frame 10 located a side close to the bottom of the electronic device 100, thereby avoiding the impact of being held by users during use.

The bottom D1 of the electronic device 100 may be an end portion located at a lower end of the electronic device 100 when the electronic device 100 is placed in a right direction. A top D2 of the electronic device 100 is generally equipped with a camera, the bottom D1 is generally equipped with a connection interface such as a USB interface, and the bottom D1 of the electronic device 100 may be specifically an end equipped with a connection interface such as a USB interface. That is, in the present disclosure, at least one gap 11 is defined on the frame equipped with the USB interface of the metal frame 10.

As shown in FIG. 1, the electronic device further includes several radio frequency sources S1, at least some of the frame segments 12 are connected to the radio frequency sources S1, and the radio frequency sources S1 are used to provide feed signals to the at least the part of the frame segments to excite the corresponding frame segments 12 to operate, so as to achieve transmission and reception of radio frequency signals of respective frequency bands under the multiple communication standards.

Specifically, different radio frequency sources S1 directly or indirectly excite the corresponding frame segments 12 to operate, so that each frame segment 12 operates in the corresponding frequency band under the corresponding communication standard. For example, a certain radio frequency source S1 may only directly excite the directly connected frame segment 12 to make the frame segment 12 operate, so as to realize the transmission and reception of radio frequency signals of the corresponding frequency band under the corresponding communication standard. For another example, another radio frequency source S1 may directly excite the directly connected frame segment 12, and may also indirectly excite the frame segments adjacent to the directly connected frame segment 12 through coupling feed excitation, so that the frame segment 12 and the adjacent frame segments may operate together to achieve the transmission and reception of radio frequency signals of the corresponding frequency band under the corresponding communication standard.

As shown in FIG. 1, in this embodiment, the number of the radio frequency sources S1 is greater than or equal to the number of the multiple frame segments 12, and each of the frame segments 12 is correspondingly connected to at least one radio frequency source S1. That is, in this embodiment, each of the frame segments 12 is connected to the radio frequency source S1, and at least one radio frequency source S1 is connected.

In the present disclosure, a term “connected” includes directly connected and indirectly connected, for example, A and B are connected, including a manner in which A and B are directly connected and another manner in which A and B indirectly connected by means of C.

Figure 8:
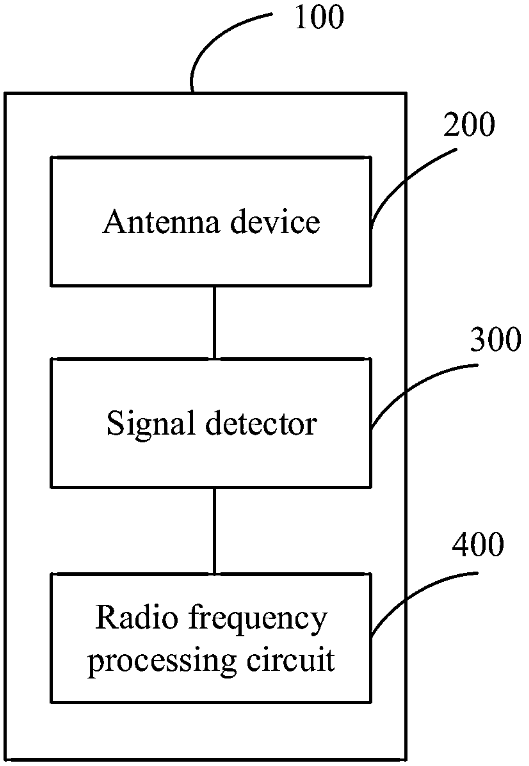
FIG. 8 illustrates a structural block diagram of some components of an electronic device according to an embodiment of the disclosure.

An antenna device 200 (as shown in FIG. 8) is formed by at least all the frame segments 12 of the metal frame 10 and the several radio frequency sources S1, that is, the antenna device 200 includes at least all the frame segments 12 of the metal frame 10 and the several radio frequency sources S1.

As shown in FIG. 1, the electronic device 100 further includes a main board 20, and the antenna device 200 further includes an antenna body 21 disposed on the main board 20. The antenna body 21 cooperates with some of the frame segments 12 to support a frequency band under one of the communication standards.

The antenna device 200 of the present disclosure only needs to set one antenna body 21 on the main board 20 in addition to the antenna bodies formed by the frame segments of the metal frame 10, and compared with the existing solution that multiple antenna bodies 21 need to disposed on the main board 20, the antenna performance of the present disclosure can be effectively improved. In this situation, the antenna body 21 set on the main board 20 supports a high-frequency band. Due to the strong penetrability of the high-frequency band, the antenna body 21 does not affect the radiation performance even if the antenna body 21 is located inside the electronic device 100.

Specifically, the antenna body 21 may be a laser direct structuring (LDS) antenna formed on an antenna bracket of the main board 20 through laser technology, that is, the antenna bracket is disposed on the main board 20, and then the LDS antenna is formed on the antenna bracket. The LDS antenna refers to a metal antenna pattern directly plated on the antenna bracket disposed on the main board 20 through laser technology. In other embodiments, the antenna body 21 may also be a flexible printed circuit board (FPC) antenna disposed on the main board 20. The FPC antenna refers to a metal antenna pattern formed on the FPC, and the FPC antenna may be fixed on the main board 20 by means of bonding, embedding, welding, etc.

In some embodiments, at least one of the multiple frame segments 12 independently supports a frequency band under a certain communication standard, and at least some of the frame segments 12 at least support a frequency band under a certain communication standard together with other frame segments.

The "at least some of the frame segments 12 support a frequency band under a certain communication standard together with other frame segments" includes: multiple frame segments 12 cooperate to support the frequency band under the certain communication standard, or multiple frame segments 12 cooperate with the antenna body 21 on the main board 20 to support the frequency band under the certain communication standard.

As shown in FIG. 1, the antenna body 21 on the main board 20 is connected to one radio frequency source S1. The antenna body 21 operates under excitation of excitation signals of the radio frequency source S1, and operates with other corresponding frame segments 12 to achieve the transmission and reception of radio frequency signals of the corresponding frequency band under the corresponding communication standard.

As shown in FIG. 1, the electronic device 100 is substantially square, and the metal frame 10 is rectangular, and the metal frame 10 includes two opposite short frames 101 and two opposite long frames 102. The two opposite short frames 101 and two opposite long frames 102 enclose to form the metal frame 10. A position of the metal frame 10 located at the bottom of the electronic device 100 may be the position of one of the short frames 101 disposed with a connection interface such as a USB interface.

The two short frames 101 include a first short frame 101*a* and a second short frame 101*b*, and the two long frames 102 include a first long frame 102*a* and a second long frame 102*b*. The first short frame 101*a* is located at the top of the electronic device 100, the second short frame 101*b* is located at the bottom of the electronic device 100, the first long frame 102*a* is located at a left side of the electronic device 100, and the second long frame 102*b* is located at a right side of the electronic device 100.

FIG. 1 is a schematic view of viewing from one side of a screen of the electronic device 100, and the orientation nouns "top", "bottom", "left side", and "right side" are orientations all viewed from the perspective of FIG. 1.

The second short frame 101*b* is disposed with a connection interface such a USB interface.

As shown in FIG. 1, in this embodiment, the first short frame 101*a* is defined with two gaps 11*a* and 11*b*, the second short frame 101*b* is defined with a gap 11*c*, the first long frame 102*a* is defined with two gaps 11*d* and 11*e*, and the second long frame 102*b* is defined with a gap 11*f*.

That is, in this embodiment, the metal frame 10 is defined with six gaps 11, and the metal frame is divided into six independent frame segments 12. In the present disclosure, the independent frame segment 12 refers to that the gap 11 completely divides the adjacent frame segments 12.

The gaps 11*a* and 11*b* defined on the first short frame 101*a* are close to the first long frame 102*a* and the second long frame 102*b* respectively. The two gaps 11*d* and 11*e* defined on the first long frame 102*a* are disposed close to the first short frame 101*a*, and the gap 11*d* is closer to the first short frame 101*a* than the gap 11*e*. The gap 11*c* defined on the second short frame 101*b* is disposed close to the first long frame 102*a*, and the gap 11*f* defined on the second long frame 102*b* is disposed close to the first short frame 101*a*.

Therefore, the two gaps 11*d* and 11*e* defined on the first long frame 102*a* and the gap 11*f* defined on the second long frame 102*b* on the metal frame 10 in the present disclosure are all disposed close to the first short frame 101*a*. In this case, the gap 11 is not disposed with a gap at a side of the electronic device 100 close to the bottom of the electronic device 100. When the user vertically holds the electronic device 100 without defined with the gap at a holding position usually located at the side of the bottom of the electronic device 100 of the present disclosure, the user's holding will not affect the antenna radiation. In the present disclosure, the vertical holding electronic device 100 refers to a manner of holding the electronic device 100 when the electronic device 100 is placed in a vertical screen display state, and correspondingly, the horizontal holding electronic device 100 refers to a manner of holding the electronic device 100 when the electronic device 100 is placed in a horizontal screen display state.

Specifically, the six frame segments 12 include a first frame segment 12*a* between the gaps 11*a* and 11*b*, a second frame segment 12*b* between the gaps 11*b* and 11*f*, a third frame segment 12*c* between the gaps 11*f* and 11*c*, a fourth frame segment 12*d* between the gaps 11*c* and 11*e*, a fifth frame segment 12*e* between the gaps 11*e* and 11*d*, and a sixth frame segment 12*f* between the gaps 11*d* and 11*a*.

Each of the first frame segment 12*a*, the second frame segment 12*b*, the fifth frame segment 12*e* and the sixth frame segment 12*f* is connected to one radio frequency source S1, and each of the third frame segment 12*c* and the fourth frame segment 12*d* is connected to two radio frequency sources S1.

A preset portion B1 between the two radio frequency sources S1 of the third frame segment 12*c* is grounded to thereby make the third frame segment 12*c* be actually divided into two antenna bodies, and the two radio frequency sources S1 of the third frame segment 12*c* are respectively connected to the two antenna bodies. A preset portion B2 between the two radio frequency sources S1 of the fourth frame segment 12*d* is grounded to thereby make the fourth frame segment 12*d* be actually divided into two antenna bodies, and the two radio frequency sources S1 of the fourth frame segment 12*d* are respectively connected to the two antenna bodies.

The preset portion between the two radio frequency sources S1 of the third frame segment 12*c* are a part of an area between the two radio frequency sources S1 of the third frame segment 12*c*, and the two radio frequency sources S1 and the grounded preset portion of the third frame segment 12*c* are spaced to form feed circuits respectively. The preset portion between the two radio frequency sources S1 of the fourth frame segment 12*d* is a part of an area between the two radio frequency sources S1. The two radio frequency sources S1 and the grounding preset portion of the fourth frame segment 12*d* are spaced to form feed circuits respectively.

Each of the first frame segment 12*a*, the second frame segment 12*b*, the fifth frame segment 12*e* and the sixth frame segment 12*f* forms one antenna body. Therefore, in the present disclosure, the multiple frame segments 12 actually form eight antenna bodies.

Specifically, a segment of the third frame segment 12*c* between the gap 11*f* and a grounded portion (i.e., the grounded preset portion B1) forms a first antenna body ANT0, and another segment of the third frame segment 12*c* between the gap 11*c* and the grounded portion (i.e., the grounded preset portion B1) forms a second antenna body ANT1. The first frame segment 12*a* forms a third antenna body ANT2, and a segment of the fourth frame segment 12*d* between the gap 11*c* and the grounded portion (i.e., the grounded preset portion B2) forms a fourth antenna body ANT3. The fifth frame segment 12*e* forms a fifth antenna body ANT4, and the second frame segment 12*b* forms a sixth antenna body ANT5. The sixth frame segment 12*f* forms a seventh antenna body ANT6. Another segment of the fourth frame segment 12*d* between the gap 11*e* and the grounded portion (i.e., the grounded preset portion B2) forms an eighth antenna body ANT7.

In the present disclosure, in addition to the antenna body 21 on the main board 20 as described above, nine antenna bodies are formed through the metal frame 10 and the antenna body 21 on the main board 20. That is, the antenna body 21 located on the main board 20 forms a ninth antenna body ANT8. In the present disclosure, a total of nine antenna bodies, ANT0~ANT8, are actually formed.

Frequency bands supported by the first antenna body ANT0 are three frequency bands including LB DRX+MHB MIMO2+N41 PRX (i.e., LB DRX, MHB MIMO2, and N41 PRX). In the present disclosure, LB refers to a low band, MHB refers to a middle high band, and N41 refers to an N41 band under the 5G NSA communication standard. That is, the first antenna body ANT0 supports the low band+the middle high band+the N41 band. Specifically, LB DRX means that the first antenna body ANT0 defaults to a diversity antenna body of in the low band, and N41 PRX means that the first antenna body ANT0 defaults to a main antenna body in the N41 band. MHB MIMO2 means that the first antenna body ANT0 supports a multiple input multiple output antenna system under the middle high band.

A frequency band supported by the second antenna body ANT1 is LB PRX, that is, the second antenna body ANT1 supports the low band. LB PRX means that the second antenna body ANT1 defaults to a main antenna body of the low band.

Frequency bands supported by the third antenna body ANT2 are MHB PRX+N78/N79 PRX, N78/N79 refers to an N78/N79 band under the 5G NSA communication standard, that is, the third antenna body ANT2 supports the middle high band+the N78/N79 band. MHB PRX means that the third antenna body ANT2 defaults to a main antenna body of the middle high band, and N78/N79 PRX means that the third antenna body ANT2 defaults to a main antenna body of the N78/N79 band.

Frequency bands supported by the fourth antenna body ANT3 are MHB DRX+N41 MIMO2, that is, the fourth antenna body ANT3 supports the middle high band and the N41 band. MHB DRX means that the fourth antenna body ANT3 defaults to a diversity antenna of the middle high band, and N41 MIMO2 means that the fourth antenna body ANT3 supports a multiple input multiple output antenna system under the N41 band.

Frequency bands supported by the fifth antenna body ANT4 are MHB MIMO 3+N41 DRX+N78/N79 DRX, that is, the fifth antenna body ANT4 supports the middle high band+the N41 band+the N78/N79 bands. MHB MIMO3 means that the fifth antenna body ANT4 supports a multiple input multiple output antenna system under the middle high band, N41 DRX means that the fifth antenna body ANT4 defaults to a diversity antenna of the N41 band, and N78/N79 DRX means that the fifth antenna body ANT4 defaults to a diversity antenna of the N78/N79 band.

A frequency band supported by the sixth antenna body ANT5 is N78/N79 MIMO3, that is, the fourth antenna body ANT3 supports the N78/N79 band, and the sixth antenna body ANT5 supports the multiple input multiple output antenna system under the N78/N79 band.

Frequency bands supported by the seventh antenna body ANT6 are GPS L1+WIFI 2.4G/5G+N41 MIMO3, that is, the seventh antenna body ANT6 supports the GPS L1 band+the WIFI 2.4G/5G band+the N41 band, and the seventh antenna body ANT6 supports a multiple input multiple output antenna system under the N78/N79 band.

The frequency of the GPS L1 band is 1575 MHz, the range of the WIFI 2.4G band is 2.4 MHz to 2.484 MHz, and the range of the WIFI 5G band is 5.15 MHz to 5.85 MHz.

Frequency bands supported by the eighth antenna body ANT7 are GPS L5+WIFI 5G+WIFI 2.4G, that is, the eighth antenna body ANT7 supports the GPS L5 band+the WIFI 2.4G band+the WIFI 5G band.

The antenna body 21 on the main board 20 forms the ninth antenna body ANT8, a frequency band supported by the ninth antenna body ANT8 is N78/N79 MIMO, that is, the antenna body 21 on the main board 20 supports the N78/N79 band under the 5G NSA communication standard, and supports the multiple input multiple output antenna system under the N78/N79 band.

Since the N78/N79 band is a high frequency band, the requirements for antenna space are relatively low, and the antenna body 21 disposed on the bracket of the main board 20 can also better achieve the N78/N79 antenna performance.

Therefore, in the present disclosure, the multiple frequency bands of 5G NSA, 5G SA, WIFI, GPS, and 2/3/4G are implemented by the frequency bands supported by the nine antenna bodies.

As described above, the frequency bands supported by the first antenna body ANT0 are LB+MHB MIMO2+N41, and the frequency band supported by the second antenna body ANT1 are LB; Therefore, the first antenna body ANT0 and the second antenna body ANT1 both independently support the 2/3/4G communication standard, that is, they can operate independently in the 2/3/4G communication standard, so as to achieve the transmission and reception of radio frequency signals of the 2/3/4G communication standard.

The frequency bands supported by the third antenna body ANT2 are MHB+N78/N79, and the third antenna body ANT2 independently supports the 2/3/4G communication standard, that is, the third antenna body ANT2 can operate independently in the 2/3/4G communication standard, so as to achieve the transmission and reception of the radio frequency signals of the 2/3/4G communication standard. The third antenna body ANT2 further supports the N78/N79 bands. The fourth antenna body ANT3 supports the MHB band+the N41 MIMO2 band, further independently supports the frequency band of 2/3/4G communication standard, and still further supports the N41 band.

As described above, the frequency bands supported by the seventh antenna body ANT6 are GPS L1+WIFI 2.4G/5G+N41 MIMO3, and the frequency bands supported by the eighth antenna body ANT7 are GPS L5+WIFI 5G+WIFI 2.4G, in this situation, the seventh antenna body ANT6 and the eighth antenna body ANT7 both independently support the frequency bands under GPS and WIFI communication standards, that is, the seventh antenna body ANT6 and the eighth antenna body ANT7 can independently achieve the transmission and reception of the radio frequency signals of the GPS and WIFI communication standards. In the present disclosure, 4G and LTE both refer to 4G LTE.

In this embodiment, 5G NSA is specifically supported by five antenna bodies, and at least one of the five antenna bodies simultaneously supports LTE and 5G bands. That is, an antenna architecture of the 5G NSA includes the above five antenna bodies, and the at least one of the five antenna bodies simultaneously supports the LTE and 5G bands to support dual frequency bands.

Therefore, compared with the architecture that requires six antennas under the existing 5G NSA communication standard, the present disclosure can reduce one antenna body, which is more conducive to the overall layout of the antenna, reduce the deployment of antennas on the main board 20, reduce the cost, and improve the overall performance of the antenna.

Figure 2:
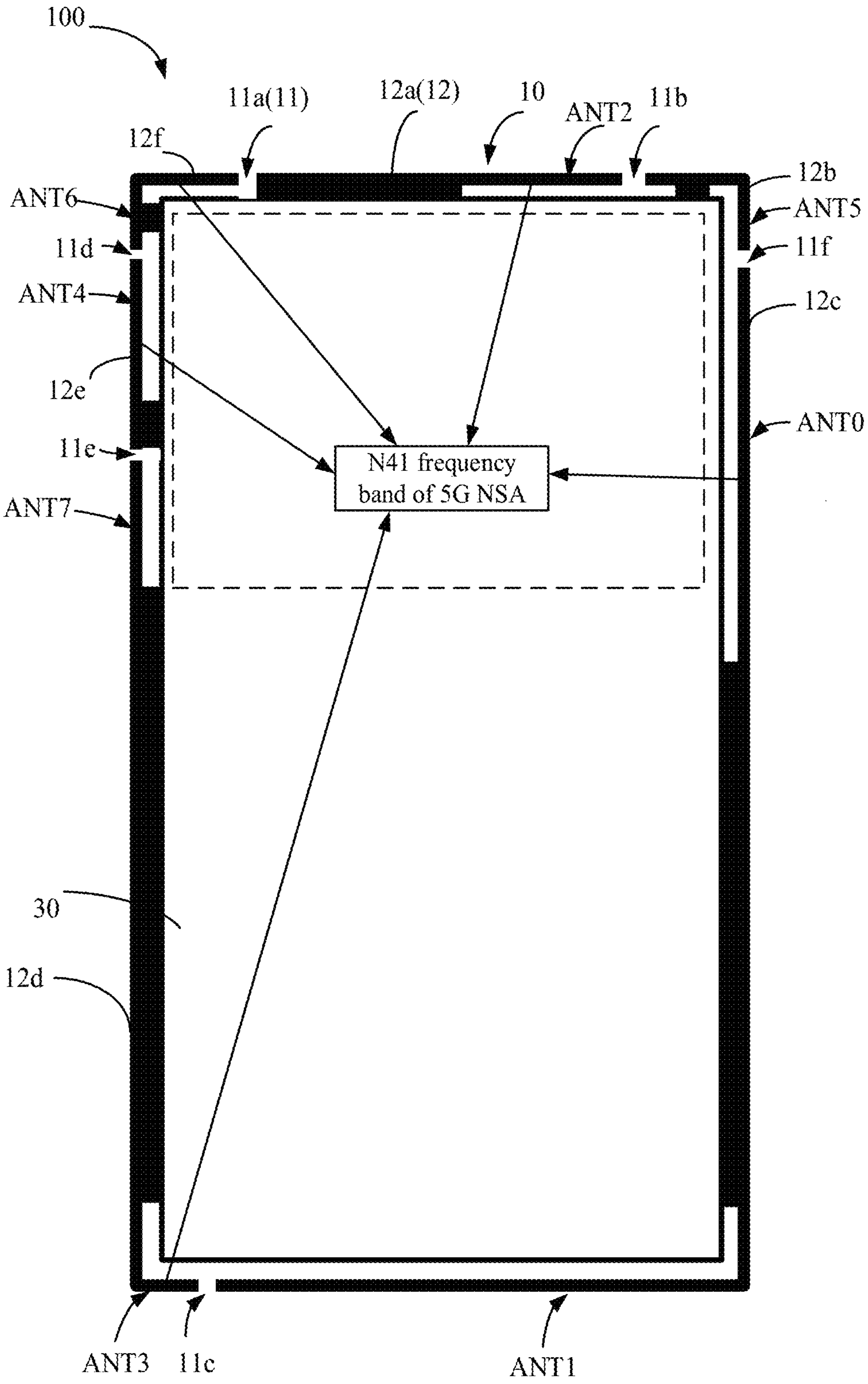
FIG. 2 illustrates a schematic plan view of an antenna architecture showing an N41 frequency band of a 5G NSA of an electronic device according to an embodiment of the present disclosure.

FIG. 2 illustrates a schematic plan view of an antenna architecture showing the N41 band of the 5G NSA of the electronic device 100 according to an embodiment of the present disclosure. In order to illustrate a composition of an antenna architecture of the N41 band of the 5G NSA clearly, FIG. 2 is simplified, and some components are omitted compared with FIG. 1.

Specifically, the N41 band of the 5G NSA is cooperatively supported by the first antenna body ANT0, the third antenna body ANT2, the fourth antenna body ANT3, the fifth antenna body ANT4 and the seventh antenna body ANT6. That is, the antenna architecture of the N41 band of the 5G NSA includes the first antenna body ANT0, the third antenna body ANT2, the fourth antenna body ANT3, the fifth antenna body ANT4 and the seventh antenna body ANT6. In this embodiment, the fourth antenna body ANT3 at least supports the LTE band and the N41 band to thereby replace the existing two antenna bodies. The third antenna body ANT2 supports the LTE band. The first antenna body ANT0, the fifth antenna body ANT4 and the seventh antenna body ANT6 all support the N41 band. In this situation, through the five antenna bodies, the two antenna bodies supporting the LTE band and the four antenna bodies supporting the N41 band are realized to thereby achieve the transmission and reception of radio frequency signals of the N41 band of the 5G NSA.

The first antenna body ANT0, the third antenna body ANT2, the fourth antenna body ANT3, the fifth antenna body ANT4 and the seventh antenna body ANT6 are generally disposed around the metal frame 10 to form a surrounding 5G antenna.

Obviously, in other embodiments, the other antenna may also support the dual bands including the LTE band and the N41 band, as long as at least one antenna body simultaneously supports the LTE band and the N41 band.

Figure 3:
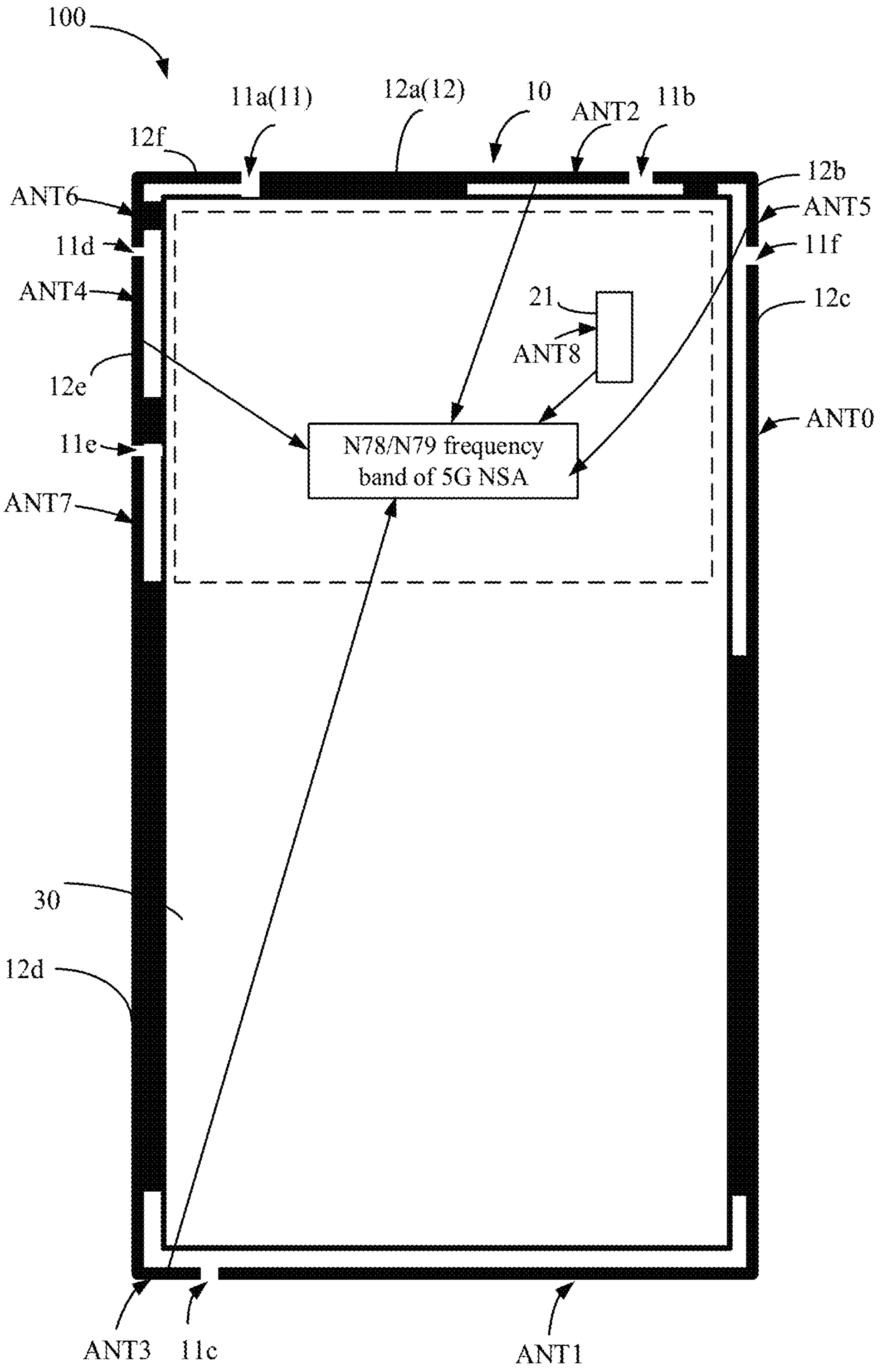
FIG. 3 illustrates a schematic plan view of an antenna architecture showing N78/N79 frequency bands of the 5G NSA of an electronic device according to an embodiment of the disclosure.

FIG. 3 illustrates a schematic plan view of an antenna architecture showing the N78/N79 bands of the 5G NSA of the electronic device 100 according to an embodiment of the disclosure. In order to illustrates the antenna architecture more clearly, FIG. 3 is simplified, and some components are omitted compared with FIG. 1.

Specifically, the N78/N79 band of the 5G NSA is cooperatively supported by the third antenna body ANT2, the fourth antenna body ANT3, the fifth antenna body ANT4, the sixth antenna body ANT5, and the ninth antenna body ANT8 (i.e., the antenna body 21 located on the main board 20). That is, the antenna architecture of the N78/N79 band of the 5G NSA includes the third antenna body ANT2, the fourth antenna body ANT3, the fifth antenna body ANT4, the sixth antenna body ANT5, and the ninth antenna body ANT8. In this embodiment, the third antenna body ANT2 supports frequency bands of MHB+N78/N79 and simultaneously supports dual bands of the LTE band and the N78/N79 band to thereby replace the existing two antenna bodies, the fourth antenna body ANT3 supports the LTE band, and the fifth antenna body ANT4, the sixth antenna body ANT5, and the ninth antenna body ANT8 all support the N78/N79 band. In this situation, through the above five antenna bodies, the two antenna bodies supporting the LTE band and the four antenna bodies supporting the N78/N79 band are realized to thereby achieve the transmission and reception of radio frequency signals of the N78/N79 band of the 5G NSA.

The antenna body 21 on the main board 20 is disposed close to the first short frame 101*a* and the second long frame 102*b*, and the third antenna body ANT2, the fourth antenna body ANT3, the fifth antenna body ANT4, the sixth antenna body ANT5, and the ninth antenna body ANT8 are generally disposed around the metal frame 10 to form a surrounding 5G antenna.

Figure 4:
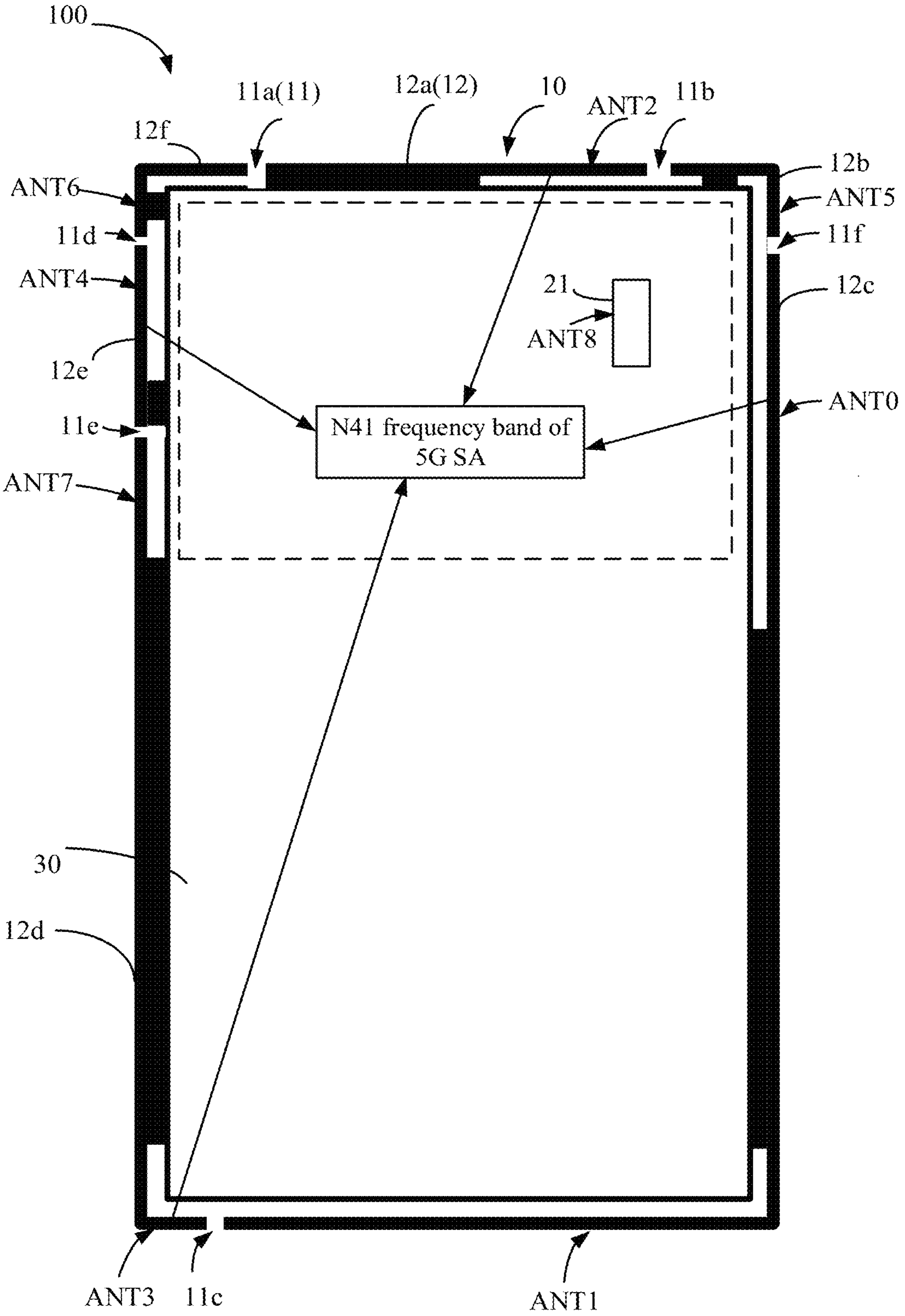
FIG. 4 illustrates a schematic plan view of an antenna architecture showing an N41 frequency band of a 5G SA of an electronic device according to an embodiment of the present disclosure.

FIG. 4 illustrates a schematic plan view of an antenna architecture showing the N41 band of the 5G SA of the electronic device 100 according to an embodiment of the present disclosure. In order to show the antenna architecture more clearly, FIG. 4 is also simplified, and some components are omitted compared with FIG. 1.

As shown in FIG. 4, the N41 band of the 5G SA in the present disclosure is supported by the first antenna body ANT0, the third antenna body ANT2, the fourth antenna body ANT3 and the fifth antenna body ANT4. That is, the antenna architecture of the N41 band of the 5G SA includes the first antenna body ANT0, the third antenna body ANT2, the fourth antenna body ANT3 and the fifth antenna body ANT4, and the transmission and reception of radio frequency signals of the N41 band under the 5G SA communication standard can be realized through the four antenna bodies. The first antenna body ANT0, the third antenna body ANT2, the fourth antenna body ANT3 and the fifth antenna body ANT4 are generally disposed around the metal frame 10 to form a surrounding 5G antenna.

Figure 5:
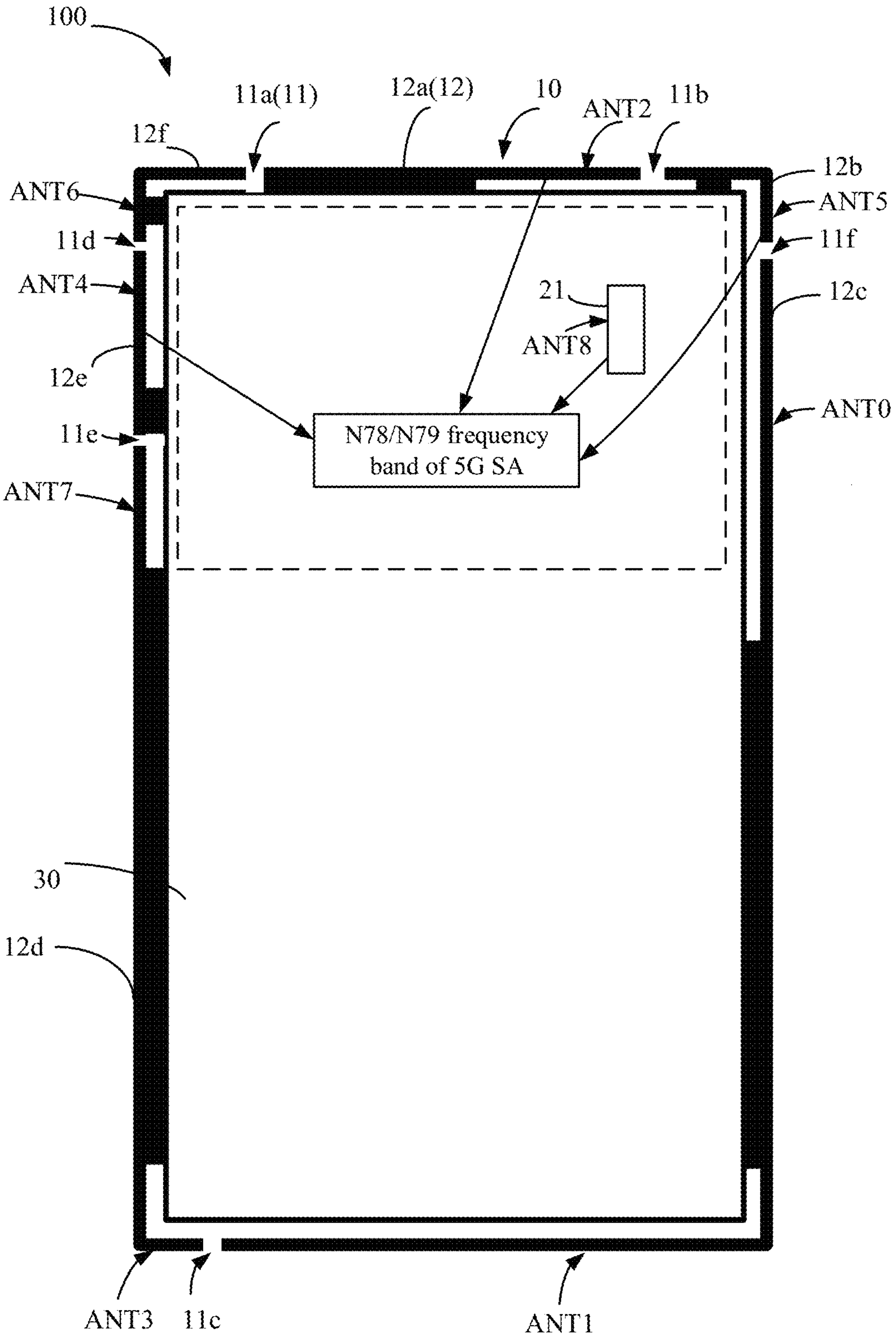
FIG. 5 illustrates a schematic plan view of an antenna architecture showing N78/N79 frequency bands of a 5G SA of an electronic device according to an embodiment of the disclosure.

FIG. 5 illustrates a schematic plan view of an antenna architecture showing the N78/N79 band of the 5G SA of the electronic device 100 according to an embodiment of the disclosure. In order to illustrates the antenna architecture more clearly, FIG. 5 is simplified, and some components are omitted compared with FIG. 1.

As shown in FIG. 5, the N78/N79 band of the 5G SA in the present disclosure is supported by the third antenna body ANT2, the fifth antenna body ANT4, the sixth antenna body ANT5, and the ninth antenna body ANT8. That is, the antenna architecture of the N78/N79 band of the 5G SA includes the third antenna body ANT2, the fifth antenna body ANT4, the sixth antenna body ANT5 and the ninth antenna body ANT8, and the transmission and reception of radio signals of the N78/N79 band under the 5G SA communication standard can be realized through the four antenna bodies.

The antenna body 21 on the main board 20 is disclosed close to the first short frame 101*a* and the second long frame 102*b*, and the third antenna body ANT2, the fifth antenna body ANT4, the sixth antenna body ANT5 and the ninth antenna body ANT8 are generally disposed around the metal frame 10 of the electronic device 100 to form a surrounding 5G antenna.

Therefore, as described above, the frequency bands supported by the antenna device 200 of the present disclosure actually include multiple frequency bands under multiple communication standards such as multiple frequency bands of GPS, multiple frequency bands of WIFI 2.4G/5G, multiple frequency bands of 2/3/4G, N41 and N78/N79 of 5G NSA, and N41 and N78/N79 of 5G SA.

In the present disclosure, when the electronic device 100 is in a network state of the 4G communication standard, several antenna bodies supporting 2/3/4G can switch between main and diversity according to a signal strength. When the electronic device 100 is in a network state of the 5G NSA communication standard, several antenna bodies supporting 5G NSA can switch between main and diversity according to a signal strength.

Specifically, the antenna bodies supporting 2/3/4G can switch between main and diversity according to the signal strength, including: switching the antenna bodies supporting 2/3/4G with relatively strong signals to the main antenna and switching the antenna bodies with relatively weak signals to the diversity antenna. Similarly, the antenna bodies supporting the 5G NSA can switch between main and diversity according to the signal strength, including: switching the antenna bodies supporting the 5G NSA with relatively strong signals to the main antenna and switching the antenna bodies supporting the 5G NSA with relatively weak signals to the diversity antenna.

Figure 6:
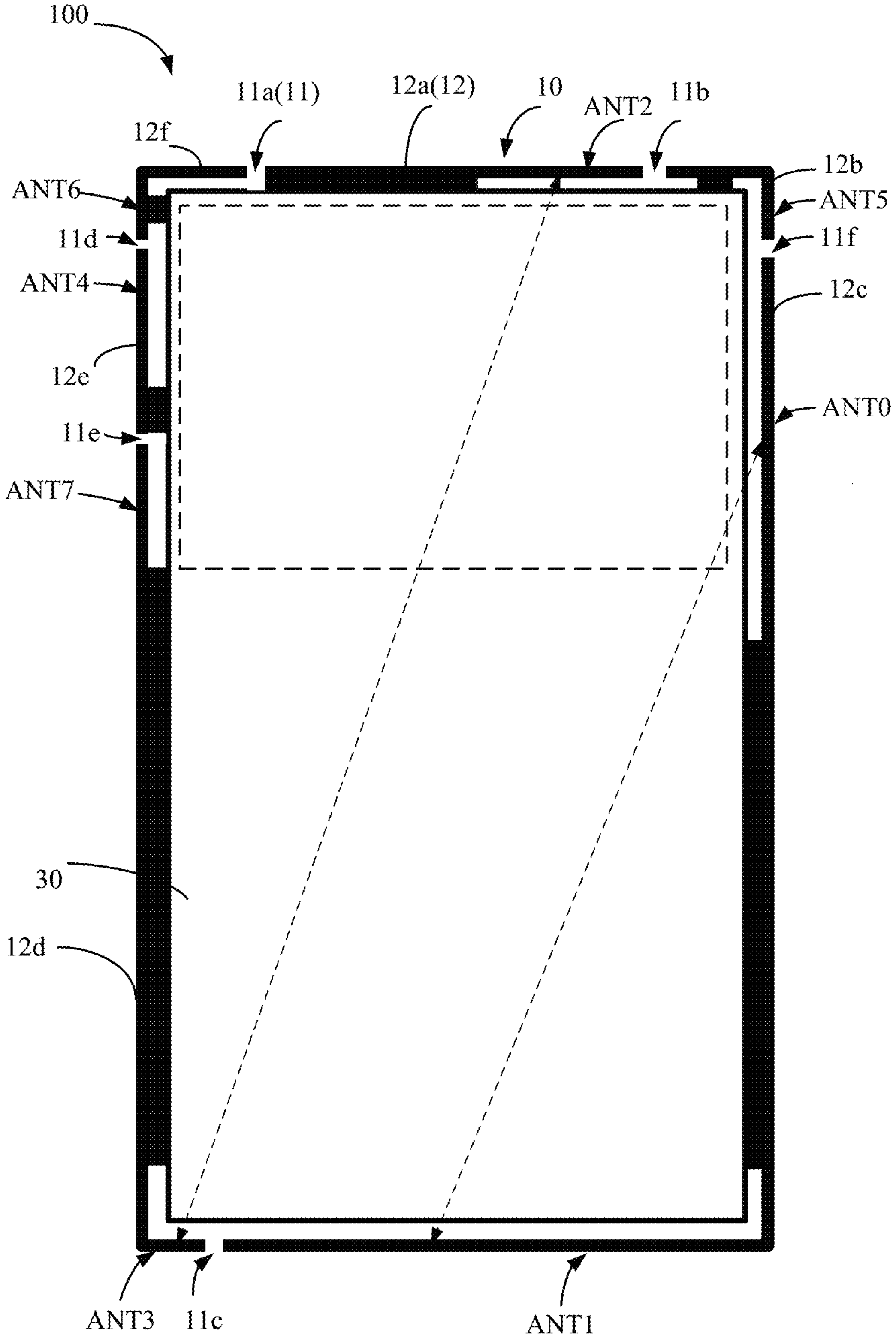
FIG. 6 illustrates a schematic view of switching of antenna bodies supporting 2/3/4G in an electronic device according to an embodiment of the present disclosure.

FIG. 6 illustrates a schematic view of switching of antenna bodies supporting 2/3/4G in the electronic device 100 according to an embodiment of the present disclosure. In order to show the switching more clearly, FIG. 6 is simplified, and some components are omitted compared with FIG. 1.

As described above, the frequency bands supported by the first antenna body ANT0 are LB+MHB MIMO2+N41, the frequency band supported by the second antenna body ANT1 is LB; the frequency bands supported by the third antenna body ANT2 are MHB+N78/N79, and the frequency bands supported by the fourth antenna body ANT3 are MHB+N41 MIMO2, that is, the middle high band and the N41 band.

Therefore, when the electronic device 100 is in the network state of the 4G communication standard, the first antenna body ANT0 and the second antenna body ANT1 both supporting LB (i.e., the low band) form an antenna pair, and the main and diversity can be switched according to the signal strength. The third antenna body ANT2 and the fourth antenna body ANT3 supporting the middle high band form an antenna pair, and the main and diversity can be switched according to the signal strength.

As shown in FIG. 1 and FIG. 6, since the first antenna body ANT0 is located on the second long frame 102*b* and the second antenna body ANT1 is located on the second short frame 101*b*, in this situation, at least one of the first antenna body ANT0 and the second antenna body ANT1 will not be held by the user regardless of whether the user holds the electronic device 100 horizontally or vertically, and the signal is good. At this time, the signal quality of the LB of 2/3/4G can be guaranteed no matter whether the user holds it horizontally or vertically through the switching of the main and diversity according to the signal strength.

As shown in FIG. 1 and FIG. 6, since the third antenna body ANT2 is located on the first short frame 101*a* and the fourth antenna body ANT3 is located on the second short frame 101*b* and a top corner of the first long frame, the third antenna body ANT2 and the fourth antenna body ANT3 are substantially diagonally distributed on the electronic device 100. In this case, at least one of the third antenna body ANT2 and the fourth antenna body ANT3 will not be held by the user regardless of whether the user holds the electronic device 100 horizontally or vertically, and the signal is good. At this time, the signal quality of the MHB of 2/3/4G can be guaranteed no matter whether the user holds horizontally or vertically through the switching of the main and diversity according to the signal strength.

Figure 7:
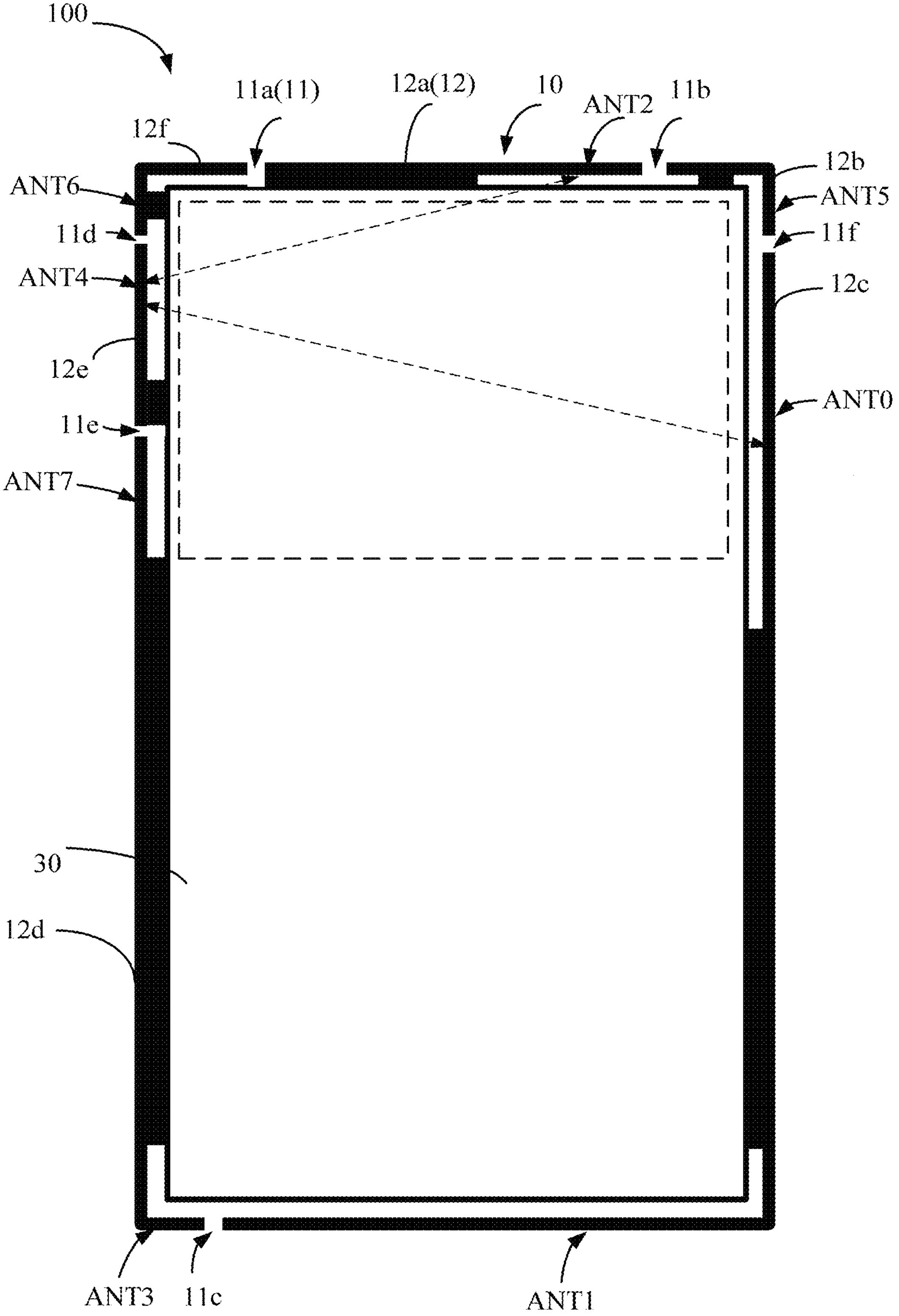
FIG. 7 illustrates a schematic view of switching between antenna bodies supporting the 5G NSA in an electronic device according to an embodiment of the present disclosure.

FIG. 7 illustrates a schematic view of switching between antenna bodies supporting the 5G NSA in the electronic device 100 according to an embodiment of the present disclosure. In order to illustrates the switching more clearly, FIG. 7 is simplified, and some components are omitted compared with FIG. 1.

As described above, the frequency bands supported by the first antenna body ANT0 are LB+MHB MIMO2+N41, the frequency bands supported by the third antenna body ANT2 are MHB+N78/N79, and the frequency bands supported by the fifth antenna body ANT4 are MHB MIMO3+N41 DRX+N78/N79 DRX.

Therefore, the fifth antenna body ANT4 supports both the N41 band and the N78/N79 band. When the electronic device 100 is in the network state of the 5G NSA communication standard, for the N41 band, the first antenna body ANT0 and the fifth antenna body ANT4 form an antenna pair, and the main and diversity can be switched according to the signal strength. For the N78/N79 band, the third antenna body ANT2 and the fifth antenna body ANT4 form an antenna pair, and the main and diversity can also be switched according to the signal strength.

As shown in FIG. 1 and FIG. 7, since the first antenna body ANT0 is located on the second long frame 102*b*, the third antenna body ANT2 is located on the first short frame 101*a*, and the fifth antenna body ANT4 is located on the first long frame 102*a*, in this situation, at least one of the first antenna body ANT0 and the fifth antenna body ANT4 will not be held by the user regardless of whether the user holds the electronic device horizontally or vertically, and the signal is good. At this time, for the N41 band, the first antenna body ANT0 and the fifth antenna body ANT4 can be switched between the main and diversity according to the signal strength to ensure the signal quality of the N41 band of the 5G NSA communication standard. Similarly, at least one of the third antenna body ANT2 and the fifth antenna body ANT4 will not be held by the user regardless of whether the user holds the electronic device horizontally or vertically, and the signal is good. At this time, for the N78/N79 band, the third antenna body ANT2 and the fifth antenna body ANT4 can be switched between the main and diversity according to the signal strength to ensure the signal quality of the N78/N79 band of the 5G NSA communication standard.

Specifically, the range of the N41 band is 2.5 GHz to 2.69 GHz, the range of the N78 band is 3.3 GHz to 3.8 GHz, and the range of the N79 band is 4.8 GHz to 5 GHz.

FIG. 8 illustrates a structural block diagram of some components of the electronic device 100 according to an embodiment of the disclosure. Specifically, the electronic device 100 includes an antenna device 200, a signal detector 300, and a radio frequency processing circuit 400. The signal detector 300 is configured to detect a signal strength of each pair of antenna bodies capable of switching between main and diversity according to the signal strength. The radio frequency processing circuit 400 is connected to the signal detector 300, and is configured to switch and control each pair of antenna bodies capable of switching between main and the diversity according to the signal strength detected by the signal detector 300.

Specifically, the radio frequency processing circuit 400 determines, according to the signal strength detected by the signal detector 300, that a difference between the signal strengths of a certain pair of antennas being capable of switching between main and diversity exceeds a preset threshold value, and when the antenna body with a lower current signal strength is the main antenna body, the radio frequency processing circuit 400 controls to switch the antenna body with the lower current signal strength to the diversity antenna body, and controls to switch the antenna body with a higher current signal strength to the main antenna body.

The preset threshold value may be 6 decibels (dB).

For example, for the antenna pair of the first antenna body ANT0 and the second antenna body ANT1 supporting the LB (i.e., the low band), when the signal strength of the first antenna body ANT0 is greater than the signal strength of the second antenna body ANT1 detected by the signal detector 300 and a difference between the two signal strengths exceeds the preset threshold value, and the first antenna body ANT0 is a diversity antenna, then the radio frequency processing circuit 400 controls to switch the first antenna body ANT0 to the main antenna and the second antenna body ANT1 to the diversity antenna.

The radio frequency processing circuit 400 may include a controller, a switching switch and other elements to realize the switching between main and diversity.

As shown in FIGS. 1-5, the electronic device 100 also includes a front housing 30, the front housing 30 is configured to support a display screen and the like of the electronic device 100 and to provide a reference ground.

As shown in FIG. 1, the preset portion B1 between the two radio frequency sources S1 of the third frame segment 12*c* extends inward, that is, an extension part Y1 extends towards a direction of the front housing 30, and the extension part Y1 is in contact with the front housing 30 to connect the reference ground. The preset portion B2 between the two radio frequency sources S1 of the fourth frame segment 12*d* extends inwards, that is, an extension part Y2 extends in the direction of the front housing 30, and the extension part Y2 is in contact with the front housing 30 to connect the reference ground.

A length of the preset portion B1 and a length of the extension part Y1 along a direction of the third frame segment 12*c* both exceed a preset length, and a length of the preset portion B2 and a length of the extension part Y2 along a direction of the fourth frame segment 12*d* both exceed a preset length, for example, both exceed ⅓ of a length of the first long frame 102*a* or the second long frame 102*b* of the metal frame 10. Thus, the extension part Y1 of the third frame segment 12*c* and the extension part Y2 of the fourth frame segment 12*d* abut against the front housing 30 in a large area, so that while grounding is achieved, the front housing 30 is supported, thereby enhancing the stability of the overall structure.

As shown in FIG. 1, an end close to an end portion of the first frame segment 12*a* forming the third antenna body ANT2 is connected to the radio frequency source S1, and the other end of the first frame segment 12*a* is grounded. The other end of the first frame segment 12*a* extends inward, that is, the other end of the first frame segment 12*a* extends towards the direction of the front housing 30 (i.e., a black part between the first frame segment 12*a* and the front housing 30 in FIG. 1) to be in contact with the front housing 30 to thereby realize grounding, thus forming a complete feed circuit. Specifically, the radio frequency source S1 is connected at a position close to the end portion of the end of the first frame segment 12*a* adjacent to the gap 11*b*, and the other end of the first frame segment 12*a* adjacent to the gap 11*a* is grounded.

An end close to an end portion of the fifth frame segment 12*e* forming the fifth antenna body ANT4 is connected to the radio frequency source S1, and the other end of the fifth frame segment 12*e* is grounded. The other end of the fifth frame segment 12*e* extends inward, that is, the other end of the fifth frame segment 12*e* extends towards the direction of the front housing 30 (i.e., a black part between the fifth frame segment 12*e* and the front housing 30 in FIG. 1) to be in contact with the front housing 30 to thereby realize grounding, thus forming a complete feed circuit. Specifically, the radio frequency source S1 is connected at a position close to the end portion of the end of the fifth frame segment 12*e* adjacent to the gap 11*d*, and the other end of the fifth frame segment 12*e* adjacent to the gap 11*e* is grounded.

An end close to an end portion of the second frame segment 12*b* forming the sixth antenna body ANT5 is connected to the radio frequency source S1, and the other end of the second frame segment 12*b* is grounded. The other end of the second frame segment 12*b* extends inward, that is, the other end of the second frame segment 12*b* extends towards the direction of the front housing 30 (i.e., a black part between the second frame segment 12*b* and the front housing 30 in FIG. 1) to be in contact with the front housing 30 to thereby realize grounding, thus forming a complete feed circuit. Specifically, the radio frequency source S1 is connected at a position close to the end portion of the end of the second frame segment 12*b* adjacent to the gap 11*f*, and the other end of the second frame segment 12*b* adjacent to the gap 11*b* is grounded.

An end close to an end portion of the sixth frame segment 12*f* forming the seventh antenna body ANT6 is connected to the radio frequency source S1, and the other end of the sixth frame segment 12*f* is grounded. The other end of the sixth frame segment 12*f* extends inward, that is, the other end of the sixth frame segment 12*f* extends towards the direction of the front housing 30 (i.e., a black part between the sixth frame segment 12*f* and the front housing 30 in FIG. 1) to be in contact with the front housing 30 to thereby realize grounding, thus forming a complete feed circuit. Specifically, the radio frequency source S1 is connected at a position close to the end portion of the end of the sixth frame segment 12*f* adjacent to the gap 11*a*, and the other end of the sixth frame segment 12*f* adjacent to the gap 11*d* is grounded.

That is, the first frame segment 12*a*, the fifth frame segment 12*e*, the second frame segment 12*b*, and the sixth frame segment 12*f* each are connected to the radio frequency source S1 at one end close to the end portion, and each are grounded at the other end.

The first frame segment 12*a*, the fifth frame segment 12*e*, the second frame segment 12*b* and the sixth frame segment 12*f* each have a certain length in a direction perpendicular to the extension direction, and can be in contact with the front housing 30 to increase the overall structural strength.

In the present disclosure, as shown in FIG. 1, a tuning switch (SW) K1 is connected between all radio frequency sources S1 and the corresponding frame segment 12, that is, each of the radio frequency sources S1 is connected to the corresponding frame segment 12 through a frequency modulation switch K1.

As shown in FIG. 1, a position of the first antenna body ANT0 located between the radio frequency source S1 and the preset portion B2 is grounded through a frequency modulation switch K2. A position of the second antenna body ANT1 located at a side of the radio frequency source S1 away from the preset portion B1 is grounded, that is, the position of the second antenna body ANT1 between the radio frequency source S1 and the gap 11*c* is grounded through a frequency modulation switch K3.

Specifically, all radio frequency sources S1 and all frequency modulation switches K1, K2 and K3 are disposed on the main board 20, the frequency modulation switch K2 is connected to a ground between the first antenna body ANT0 and the main board 20 to achieve grounding, and the frequency modulation switch K3 is connected to a ground between the second antenna body ANT1 and the main board 20 to achieve grounding. The attached drawings of the present disclosure are only schematic views. For example, actual positions of the radio frequency source S1 and frequency modulation switch K1 connected to the frame segment 12 corresponding to the second short frame 101*b* should be located on the main board 20, however, in order to illustrate more clearly, they are drawn outside the main board 20. In fact, for the frame segment 12 far from the main board 20, the frame segment 12 and the radio frequency source S1 on the main board 20 may be electrically connected through wires, resilient sheets, etc.

The ground on the main board 20 is connected to the front housing to form a common ground.

The frequency modulation switches K1, K2 and K3 all are switches connected to frequency modulation elements such as capacitors and/or inductors, and the frequency modulation switches K1, K2 and K3 play a matching role, that is, matching circuits.

The frequency modulation switches K1, K2 and K3 all belong to structures of antenna device 200. That is, the antenna device 200 may include the aforementioned metal frame 10, the antenna body 21, the radio frequency sources S1, the frequency modulation switches K1, K2 and K3, etc.

Figure 9:
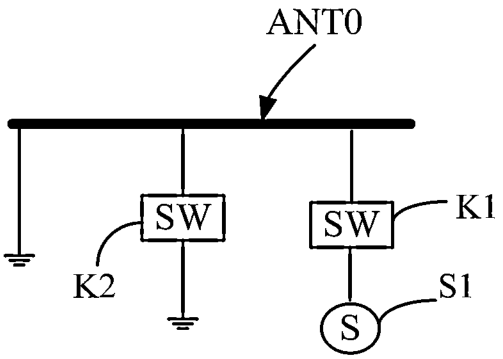
FIG. 9 illustrates an equivalent schematic diagram of a feeding structure of a first antenna body according to an embodiment of the disclosure.

FIG. 9 illustrates an equivalent schematic diagram of a feeding structure of the first antenna body ANT0 according to an embodiment of the disclosure. As shown in FIG. 9, the radio frequency source S1 corresponding to the first antenna body ANT0 is connected to one end of the first antenna body ANT0 through the tuning switch K1, and the other end of the first antenna body ANT0 is directly grounded, that is, the other end of the first antenna body ANT0 is grounded through the preset portion B1 being connected to the front housing 30; and the frequency modulation switch K2 located between a connection position of the radio frequency source S1 and the first antenna body ANT0 and a grounded position at the other end of the first antenna body ANT0 is grounded. Thus, the excitation signal generated by the radio frequency source S1 can be grounded through the frequency modulation switch K2, and also directly grounded through the other end of the first antenna body ANT0 to form a multi-circuit feed path, thereby realizing an antenna structure covering the three frequency bands of LB+MHB MIMO2+N41.

In some embodiments, the electronic device 100 may further include an insulating layer covering the periphery of the metal frame 10, the insulating layer is composed of insulating materials, which is used to block the gaps of the metal frame 10 to improve the appearance consistency. Since the insulating layer is composed of insulating materials, it will not affect the radiation of the antenna signal. The insulating layer and the metal frame 10 together constitute the frame of the electronic device 100.

In other embodiments, some frame segments 12 of the multiple frame segments 12 are connected to radio frequency source S1, and at least one frame segment 12 is not connected to radio frequency source S1. That is, in other embodiments, only some of the multiple frame segments 12 are connected to the radio frequency source S1.

The frame segment 12 not connected to the radio frequency source S1 is grounded, and the frame segment 12 not connected to the radio frequency source S1 is coupled with the adjacent frame segment 12 connected to the radio frequency source S1, which is used as a reinforced antenna body or a parasitic antenna body of the antenna body formed by the frame segment connected to the radio frequency source S1.

Thus, in other embodiments, some of the frame segments 12 of multiple frame segments 12 are connected to the radio frequency source S1, the at least one frame segment 12 is not connected to the radio frequency source S1, and the frame segment 12 not connected to the radio frequency source S1 is coupled with the adjacent frame segment 12 connected to the radio frequency source S1, to thereby be used as the reinforced antenna body or the parasitic antenna body of the antenna body formed by the frame segment connected to the radio frequency source, in this situation, the number of radio frequency sources can be reduced, and the antenna performance can be improved or the antenna frequency bands ban be increased.

The electronic device 100 may further include structures such as a display screen and a glass cover plate. Since the electronic device 100 is not related to the improvement of the present disclosure, the electronic device 100 is not described and illustrated. For example, the cross-sectional views shown in FIG. 1 and the like are schematic views without the structures such as the display screen and the glass cover plate, and merely illustrate the component structures involved in the present disclosure.

The electronic device 100 may be a mobile phone or a tablet computer.

The electronic device 100 and antenna device 200 provided in the present disclosure can support the frequency bands under multiple communication standards including 5G NSA, 5G SA, WIFI, GPS and 2/3/4G by taking multiple frame segments of the metal frame 10 as the antenna bodies, meeting the communication requirements. The at least one gap is defined at the bottom of the electronic device 100 of the metal frame 10, the gap of the metal frame 10 at the bottom of the side of the electronic device 100 can be reduced or avoided, so as to avoid the impact caused by being held by the user during use. In addition, compared with the existing architecture that requires six antennas under the 5G NSA communication standard, the present disclosure can reduce one antenna body, which is more conducive to the overall layout of the antenna, reduce the deployment of antennas on the main board 20, reduce the cost, and improve the overall performance of the antenna.

The forgoing is implementations of the embodiments of the present disclosure. It should be pointed out that for those skilled in the related art, several improvements and modifications can be made without departing from the principles of the embodiments of the present disclosure, and these improvements and modifications are also considered as the protection scope of the present disclosure.

What is claimed is:

1. An electronic device, comprising:

a metal frame, defined with a plurality of gaps, wherein the plurality of gaps divide the metal frame into a plurality of frame segments being independent from one another, the plurality of frame segments are configured as antenna bodies supporting frequency bands of communication standards;

wherein at least three frame segments of the plurality of frame segments are capable of supporting one fifth-generation mobile communication technology (5G) frequency band, at least one frame segment of the at least three frame segments supporting the one 5G frequency band further supports a middle high band (MHB) frequency band of long term evolution (LTE), and remaining frame segments of the plurality of frame segments excepting the at least three frame segments capable of supporting the one 5G frequency band do not support the one 5G frequency band, and at least one frame segment of the remaining frame segments supports the MHB frequency band of LTE; and wherein the at least one frame segment, supporting the MHB frequency band of LTE, of the remaining frame segments is configured to realize a 5G non-standalone (NSA) communication standard for the one 5G frequency band together with the at least three frame segments supporting the one 5G frequency band.

2. The electronic device according to claim 1, wherein at least one frame segment of the plurality of frame segments independently supports one of the frequency bands of communication standards, and some frame segments of the plurality of frame segments at least support one of the frequency bands of communication standards together with other frame segments of the plurality of frame segments.

3. The electronic device according to claim 2, further comprising:

a main board, disposed with an antenna body;

wherein the some frame segments of the plurality of frame segments at least support one of the frequency bands of communication standards together with other frame segments of the plurality of frame segments, further comprises:

the some frame segments and the other frame segments cooperate to support the one of the frequency bands of communication standards; or the some frame segments and the other frame segments cooperate with the antenna body disposed on the main board to support the one of the frequency bands of communication standards.

4. The electronic device according to claim 3, further comprising a plurality of radio frequency sources, wherein at least some of the plurality of frame segments are connected to the plurality of radio frequency sources, and the at least some of the plurality of frame segments are configured to operate in the frequency bands of communication standards under excitation of feed signals generated by the plurality of radio frequency sources.

5. The electronic device according to claim 4, wherein a number of the plurality of radio frequency sources is greater than or equal to that of the plurality of frame segments, and each of the plurality of frame segments is connected to at least one of the plurality of radio frequency sources correspondingly.

6. The electronic device according to claim 4, wherein the metal frame comprises two short frames opposite with each other and two long frames opposite with each other, and one short frame, disposed with a USB interface, of the two short frames is at least defined with at least one of the plurality of gaps;

wherein the two short frames comprise a first short frame and a second short frame, the two long frames comprise a first long frame and a second long frame, the first short frame is defined with a first gap of the plurality of gaps and a second gap of the plurality of gaps, the second short frame is defined with a third gap of the plurality of gaps, the first long frame is defined with a fourth gap of the plurality of gaps and a fifth gap of the plurality of gaps, and the second long frame is disposed with a sixth gap of the plurality of gaps; and wherein the first gap, the second gap, the third gap, the fourth gap, the fifth gap, and the sixth gap divide the metal frame into six frame segments being independent from one another.

7. The electronic device according to claim 6, wherein the first gap and the second gap defined on the first short frame are close to the first long frame and the second long frame respectively, the fourth gap and the fifth gap defined on the first long frame are close to the first short frame, the fourth gap is closer to the first short frame than the fifth gap, the third gap defined on the second short frame is close to the first long frame, and the sixth gap defined on the second long frame is close to the first short frame.

8. The electronic device according to claim 6, wherein the six frame segments comprise a first frame segment between the first gap and the second gap, a second frame segment between the second gap and the sixth gap, a third frame segment between the sixth gap and the third gap, a fourth frame segment between the third gap and the fifth gap, a fifth frame segment between the fifth gap and the fourth gap, and a sixth frame segment between the fourth gap and the first gap;

wherein each of the first frame segment, the second frame segment, the fifth frame segment and the sixth frame segment is connected to one of the plurality of radio frequency sources, and each of the third frame segment and the fourth frame segment is connected to two radio frequency sources of the plurality of frequency sources.

9. The electronic device according to claim 8, wherein a first preset portion located between the two radio frequency sources of the third frame segment is grounded to thereby make the third frame segment be actually divided into two of the antenna bodies, the two radio frequency sources of the third frame segment are respectively connected to the two of the antenna bodies;

wherein a second preset portion located between the two radio frequency sources of the fourth frame segment is grounded to thereby make the fourth frame segment be actually divided into another two of the antenna bodies, the two radio frequency sources of the fourth frame segment are respectively connected to the another two of the antenna bodies; and wherein each of the first frame segment, the second frame segment, the fifth frame segment and the sixth frame segment forms one of the antenna bodies.

10. The electronic device according to claim 9, wherein a segment of the third frame segment between the sixth gap and the first preset portion forms a first antenna body of the antenna bodies, another segment of the third frame segment between the third gap and the first preset portion forms a second antenna body of the antenna bodies, the first frame segment forms a third antenna body of the antenna bodies, a segment of the fourth frame segment between the third gap and the second preset portion forms a fourth antenna body of the antenna bodies, a fifth frame segment forms a fifth antenna body of the antenna bodies, the second frame segment forms a sixth antenna body of the antenna bodies, the sixth frame segment forms a seventh antenna body of the antenna bodies, another segment of the fourth frame segment between the fifth gap and the second preset portion forms a eighth antenna body of the antenna bodies, and the antenna body on the main board is a ninth antenna body.

11. The electronic device according to claim 10, wherein the 5G NSA communication standard is supported by five antenna bodies of the nine antenna bodies, and at least one of the five antenna bodies simultaneously supports an LTE frequency band and the one 5G frequency band.

12. The electronic device according to claim 10, wherein frequency bands supported by the first antenna body are low band diversity receive (LB DRX)+middle high band multiple input multiple output (MHB MIMO2)+N41 primary receive (PRX), a frequency band supported by the second antenna body is LB PRX, frequency bands supported by the third antenna body are MHB PRX+N78/N79 PRX, frequency bands supported by the fourth antenna body are MHB DRX+N41 MIMO2, frequency bands supported by the fifth antenna body are MHB MIMO3+N41 DRX+N78/N79 DRX, a frequency band supported by the sixth antenna body is N78/N79 MIMO3, frequency bands supported by the seventh antenna body are GPS L1+WIFI 2.4G/5G+N41 MIMO3, frequency bands supported by the eighth antenna body are GPS L5+WIFI 5G+WIFI 2.4G, and a frequency band supported by the ninth antenna body is N78/N79 MIMO2.

13. The electronic device according to claim 12, wherein an N41 frequency band of the 5G NSA communication standard is supported by the first antenna body, the third antenna body, the fourth antenna body, the fifth antenna body, and the seventh antenna body; the fourth antenna body at least supports the LTE frequency band and the N41 frequency band, the third antenna supports the LTE frequency band; and the first antenna body, the fifth antenna body, and the seventh antenna body all support the N41 frequency band.

14. The electronic device according to claim 12, wherein an N78/N79 frequency band of the 5G NSA communication standard is supported by the third antenna body, the fourth antenna body, the fifth antenna body, the sixth antenna body and the ninth antenna body; and wherein the third antenna body simultaneously supports the LTE frequency band and the N78/N79 frequency band, the fourth antenna body supports the LTE frequency band; and the fifth antenna body, the sixth antenna body, and the ninth antenna body support the N78/N79 frequency bands.

15. The electronic device according to claim 12, wherein an N41 frequency band of a 5G standalone (SA) communication standard is supported by the first antenna body, the third antenna body, the fourth antenna body, and the fifth antenna body.

16. The electronic device according to claim 12, wherein an N78/N79 frequency band of a 5G SA communication standard is supported by the third antenna body, the fifth antenna body, the sixth antenna body, and the ninth antenna body.

17. The electronic device according to claim 12, wherein several antenna bodies supporting at least one selected from the group consisting of a second-generation mobile communication technology, a third-generation mobile communication technology, and a fourth-generation mobile communication technology (2/3/4G) are capable of switching between a main antenna and a diversity antenna according to a signal strength when the electronic device is in a network state of a 4G communication standard; and several antenna bodies supporting the 5G NSA communication standard are capable of switching between the main antenna and the diversity antenna according to the signal strength when the electronic device is in a network state of the 5G NSA communication standard.

18. The electronic device according to claim 10, further comprising:

a front housing, configured to provide a reference ground;

wherein the first preset portion located between the two radio frequency sources of the third frame segment extends to form a first extension part facing towards a direction of the front housing, and the first extension part is in contact with the front housing to connect the reference ground;

the second preset portion located between the two radio frequency sources of the fourth frame segment extends to form a second extension part facing toward the direction of the front housing, and the second extension part is in contact with the front housing to connect the reference ground; and wherein a length of the first preset portion and a length of the first extension part along a direction of the third frame segment both exceed a preset length, and a length of the second preset portion and a length of the second extension part along a direction of the fourth frame segment both exceed a preset length; and the first extension part of the third frame segment and the second extension part of the fourth frame segment both abut against the front housing to support the front housing while achieving grounding.

19. The electronic device according to claim 10, wherein each of the first frame segment, the fifth frame segment, the second frame segment, and the sixth frame segment is connected to the one of the plurality of radio frequency sources at a position of an end close to an end portion, and each is grounded at another end; and wherein a position of the first antenna body located between the radio frequency source and the first preset portion is grounded through a frequency modulation switch, and a position of a side, far away from the first preset portion, of the radio frequency source of the second antenna body is grounded through another frequency modulation switch.

20. The electronic device according to claim 4, wherein a tuning switch is connected between each of the plurality of radio frequency sources and a corresponding one of the plurality of frame segments, and each of the plurality of radio frequency sources is connected to the corresponding one of the plurality of frame segments through a corresponding one frequency modulation switch.

* * * * *